(12) United States Patent
Weng et al.

(10) Patent No.: US 8,984,350 B1
(45) Date of Patent: Mar. 17, 2015

(54) REPLICATION METHOD AND APPARATUS IN A DISTRIBUTED SYSTEM

(75) Inventors: Zhi Weng, San Jose, CA (US); Lantian Zheng, San Jose, CA (US)

(73) Assignee: Google Inc., Mountain View, CA (US)

( * ) Notice: Subject to any disclaimer, the term of this patent is extended or adjusted under 35 U.S.C. 154(b) by 403 days.

(21) Appl. No.: 13/447,358

(22) Filed: Apr. 16, 2012

(51) Int. Cl.
*G06F 11/00* (2006.01)
*G06F 7/00* (2006.01)

(52) U.S. Cl.
USPC .......... 714/47.1; 707/648; 707/802; 707/804; 707/999.002; 707/999.005; 707/610; 707/635; 709/227

(58) Field of Classification Search
USPC ............................ 707/648, 802, 804; 709/227
See application file for complete search history.

(56) References Cited

U.S. PATENT DOCUMENTS

| | | | |
|---|---|---|---|
| 6,122,630 A * | 9/2000 | Strickler et al. .................... | 1/1 |
| 7,103,586 B2 | 9/2006 | Holenstein et al. | |
| 7,158,998 B2 | 1/2007 | Bhuyan | |
| 7,587,435 B2 | 9/2009 | Shepherd | |
| 7,685,170 B2 | 3/2010 | Barsness et al. | |
| 7,702,698 B1 | 4/2010 | Chakravarthy | |
| 7,809,764 B2 | 10/2010 | Mak | |
| 2002/0049776 A1 * | 4/2002 | Aronoff et al. ............... | 707/200 |
| 2003/0225760 A1 * | 12/2003 | Ruuth et al. ...................... | 707/5 |
| 2004/0148397 A1 * | 7/2004 | Aronoff et al. ............... | 709/227 |
| 2005/0114285 A1 * | 5/2005 | Cincotta ........................ | 707/1 |
| 2008/0114816 A1 * | 5/2008 | Shepherd ...................... | 707/201 |
| 2010/0161551 A1 * | 6/2010 | Whynot ........................ | 707/610 |
| 2012/0030172 A1 * | 2/2012 | Pareek et al. ................. | 707/635 |
| 2013/0318044 A1 * | 11/2013 | Pareek et al. ................. | 707/635 |

* cited by examiner

*Primary Examiner* — Bryce Bonzo
*Assistant Examiner* — Jeison C Arcos
(74) *Attorney, Agent, or Firm* — Young Basile Hanlon & MacFarlane P.C.

(57) ABSTRACT

Embodiments of a method and apparatus for replicating a process performed on a first computer on a remote computer, particularly for the replication of a database maintained of each of the computers. An offset is added to time stamps for a sequence of commands so that a correction in a command or data associated with the command that is subsequently received before the command is executed can be implemented. The correction can result in removing the command from the sequence of commands to be performed, changing the data associated with the command or delaying execution of the command, for example.

15 Claims, 4 Drawing Sheets

180

| TIME | COMMAND |
|---|---|
| 15:21:00 | CREATE TABLE tbl_1(id INT); |
| 15:21:01 | INSERT INTO tbl_1(id) VALUES(1); |
| 15:21:02 | INSERT INTO tbl_1(id) VALUES(2); |
| 15:21:03 | COMMIT; |

| TIME | COMMAND |
|---|---|
| 15:26:00 | CREATE TABLE tbl_1(id INT); |
| 15:26:01 | INSERT INTO tbl_1(id) VALUES(1); |
| 15:26:02 | INSERT INTO tbl_1(id) VALUES(2); |
| 15:26:03 | COMMIT; |

FIG. 5

REPLICATION METHOD AND APPARATUS IN A DISTRIBUTED SYSTEM

TECHNICAL FIELD

The present disclosure relates in general to providing improved replication of commands over more than one location. In particular it relates to replication of commands (e.g. for a database) in a distributed system.

BACKGROUND

Databases are used to store data and provide structured access to that data. Databases can be small such that they are able to be contained and accessed on a single computer system. An example of this might be an individual's personal financial data. Databases also can be large and distributed over more than one location. An example of this might be an airline reservation system that contains information on every seat on every flight operated by an airline and needs to be accessed in real time from numerous locations to make, check and change reservations. In general, despite differences in size, design, access frequency and contents, databases should provide reliable access to accurate data in a timely fashion.

SUMMARY

Disclosed herein are embodiments of a method and apparatus for replicating a process performed on a first computer on a remote computer. One aspect of such a method comprises receiving a plurality of commands from the first computer at the remote computer, identifying a first time stamp associated with each of the plurality of commands, each first time stamp representing a time at which a respective command was generated, forming a queue for the plurality of commands in an order based on the first time stamp, determining a second time stamp associated with each of the plurality of commands that is a function of the associated first time stamp and an offset, and performing the process by executing commands in the queue when a system time stamp of the remote computer reaches the second time stamp associated with each of the commands in the queue.

An aspect of the disclosed embodiments also includes an apparatus where the apparatus comprises a memory of the remote computer and a processor of the remote computer configured to execute instructions stored in the memory to receive a plurality of commands from the first computer, identify a first time stamp associated with each of the plurality of commands, each first time stamp representing a time at which a respective command was generated, form a queue for the plurality of commands in an order based on the first time stamp, determine a second time stamp associated with each of the plurality of commands that is a function of the associated first time stamp and an offset, and perform the process by executing commands in the queue when a system time stamp of the remote computer reaches the second time stamp associated with each of the commands in the queue.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein:

FIG. 4 is a table containing examples of queued time stamped commands and data; and FIG. 5 is a table containing the commands and data of FIG. 4 including an offset added to the time stamps.

DETAILED DESCRIPTION

Figure 1:
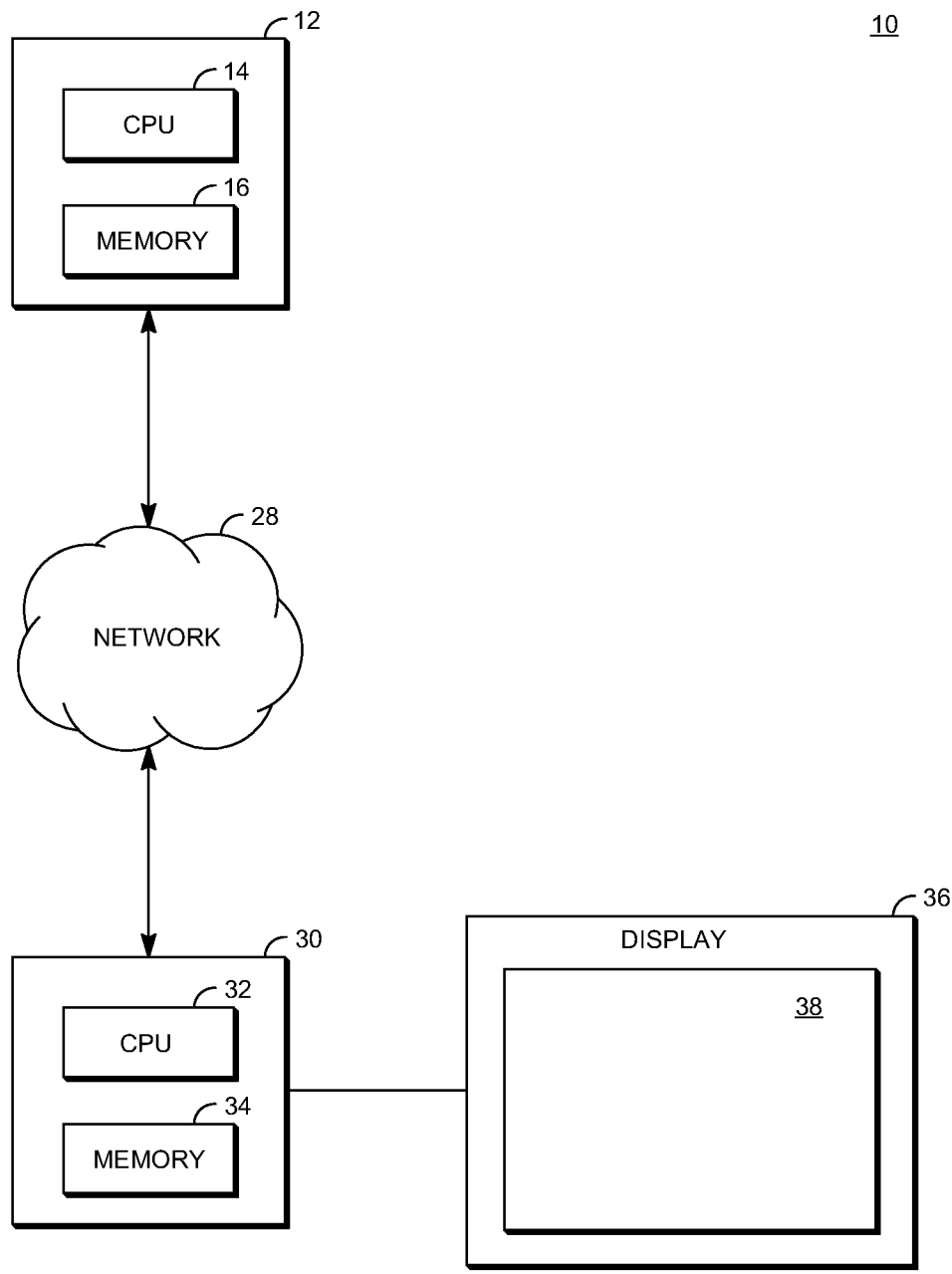
FIG. 1 is a schematic of a distributed computing system.

Database technology is nearly ubiquitous in modern computing environments. Many databases contain vast amounts of data that must be accessible instantly and reliably from widely separated locations that are generally connected by a network. In order to meet the needs for reliable, instant access to accurate data, databases are often replicated, meaning that multiple copies of the database are created and maintained to provide greater access and data integrity. Maintaining exact copies of the database in more than one location on a network while the database is being accessed and updated requires that the data in multiple locations should be synchronized continuously as they are being used. Maintaining data synchronization means that asynchronous access to any one of the multiple locations should always return the expected result. Making exact copies of the database and distributing it to multiple locations guarantees that the databases will be exact but is generally too inefficient to be performed except in exceptional circumstances, i.e., initial setup or recovery from a hardware failure.

Many databases use a Structured Query Language (SQL) to provide access to and manage data in a relational database. SQL consists of commands or instructions that are sent to a database to process data, including for example, inserting data, retrieving data or re-arranging data in the database. These commands can be input from users or generated programmatically from another computer or system connected to the database. In replicated databases, once the databases are synchronized, they can be maintained in synchrony by replicating commands and data among the various copies of the database. A copy of the data and commands input to one copy of the database are distributed to each replicated copy of the database. Each copy of the database then executes the commands on the data and performs the indicated processing on their copy of the database, thereby causing each database to contain the same data following the processing. Each command can be time stamped with the exact time the command was issued. These replicated commands may be received from multiple remote database locations that may have varying network access and therefore varying network transmission times. Further, any given database location may be inaccessible at any given time due to planned or unplanned system outages. Time stamping the replicated commands allows the commands to be received at a database location at varying times but still be queued up to execute in the correct order to maintain database integrity.

Issues in maintaining database integrity while replicating commands include handling erroneous commands. In data replication schemes, the SQL commands are typically replicated and sent to other databases from a remote database before they are executed on the remote database. This means that if the remote database or the user determines that a particular SQL command is erroneous, it may likely have already been sent to other databases to update their data. This will require that further commands be sent to undo the effects of the first. In this case, other commands to access the erroneous data may have been received between the receipt of the initial erroneous command and the receipt of commands designed to correct the erroneous command, thereby permitting the access of erroneous data.

Embodiments described herein permit correction of erroneous SQL commands in replicated database applications that mitigate erroneous data access. Specifically, a delay is inserted a delay in the processing of remotely generated commands to permit the sending database to detect errors and transmit corrective commands that can modify the delayed commands at the receiving database and thereby prevent erroneous data access. Although SQL commands are used as examples herein, embodiments of this invention can be used to detect and correct any sequence of commands designed to be executed on distributed databases, for example data block based replicated databases that transmit any changed data block of a primary database to replicated databases.

FIG. 1 is a schematic of a distributed computing system 10. An exemplary first station 12 can be, for example, a computer having an internal configuration of hardware including a processor such as a central processing unit (CPU) 14 and a memory 16. CPU 14 is a controller for controlling the operations of first station 12. CPU 14 is connected to memory 16 by, for example, a memory bus. Memory 16 can be read only memory (ROM), random access memory (RAM) or any other suitable memory device. Memory 16 stores data and program instructions that are used by CPU 14. Other suitable implementations of first station 12 are possible. For example, the processing of first station 12 can be distributed among multiple devices.

A network 28 connects first station 12 and a second station 30 for transmitting data and commands between stations 12, 30. Specifically, the data and commands can be sent from first station 12 and the data and commands can be received and processed at second station 30 or vice versa. Network 28 can, for example, be the Internet. Network 28 can also be a local area network (LAN), wide area network (WAN), virtual private network (VPN), or any other means of transferring the data and commands between first station 12 and second station 30.

Second station 30, in one example, can be a computer having an internal configuration of hardware including a processor such as a CPU 32 and a memory 34. CPU 32 is a controller for controlling the operations of the second station 30. CPU 32 can be connected to memory 34 by, for example, a memory bus. Memory 34 can be RAM or any other suitable memory device. Memory 34 stores data and program instructions that are used by CPU 32. Other suitable implementations of second station 30 are possible. For example, the processing of second station 30 can be distributed among multiple devices.

A monitor 36 configured to display data can be connected to second station 30. Monitor 36 can be implemented in various ways, including by a liquid crystal display (LCD) or a cathode-ray tube (CRT) or light emitting diode (LED) display, including an OLED display. Monitor 36 can be configured to display data at second station 30, such as data 38 of a replicated database.

In embodiments taught herein, first and second stations 12, 30 both contain a replicated database having data and commands, wherein second station 30 would be expected to have a substantially exact copy of the database residing on first station 12. Although only two stations 12, 30 are shown in FIG. 1, more than two stations can be connected through network 28 to include the replicated database.

In this example, if a user inputs commands to insert data into the database on first station 12, the system would time stamp the input commands and data and send a copy to second station 30 while executing the commands on first station 12. Second station 30 would receive the commands and data along with the time stamps and queue them for processing in time stamp order after having incremented the time stamp by a predetermined offset to delay the processing of received commands on second station 30. Second station 30 examines the time stamped commands and executes them when the time stamp equals or exceeds the current time. If first station 12 discovers that a previously sent command contained an error, and the elapsed time is less than the predetermined offset added to the time stamps, first station 12 sends a message to second station 30 to modify or delete the time stamped commands in second station 30 queue before they can be executed on second station 30, thereby preventing corruption of the replicated database residing on second station 30.

Figure 2:
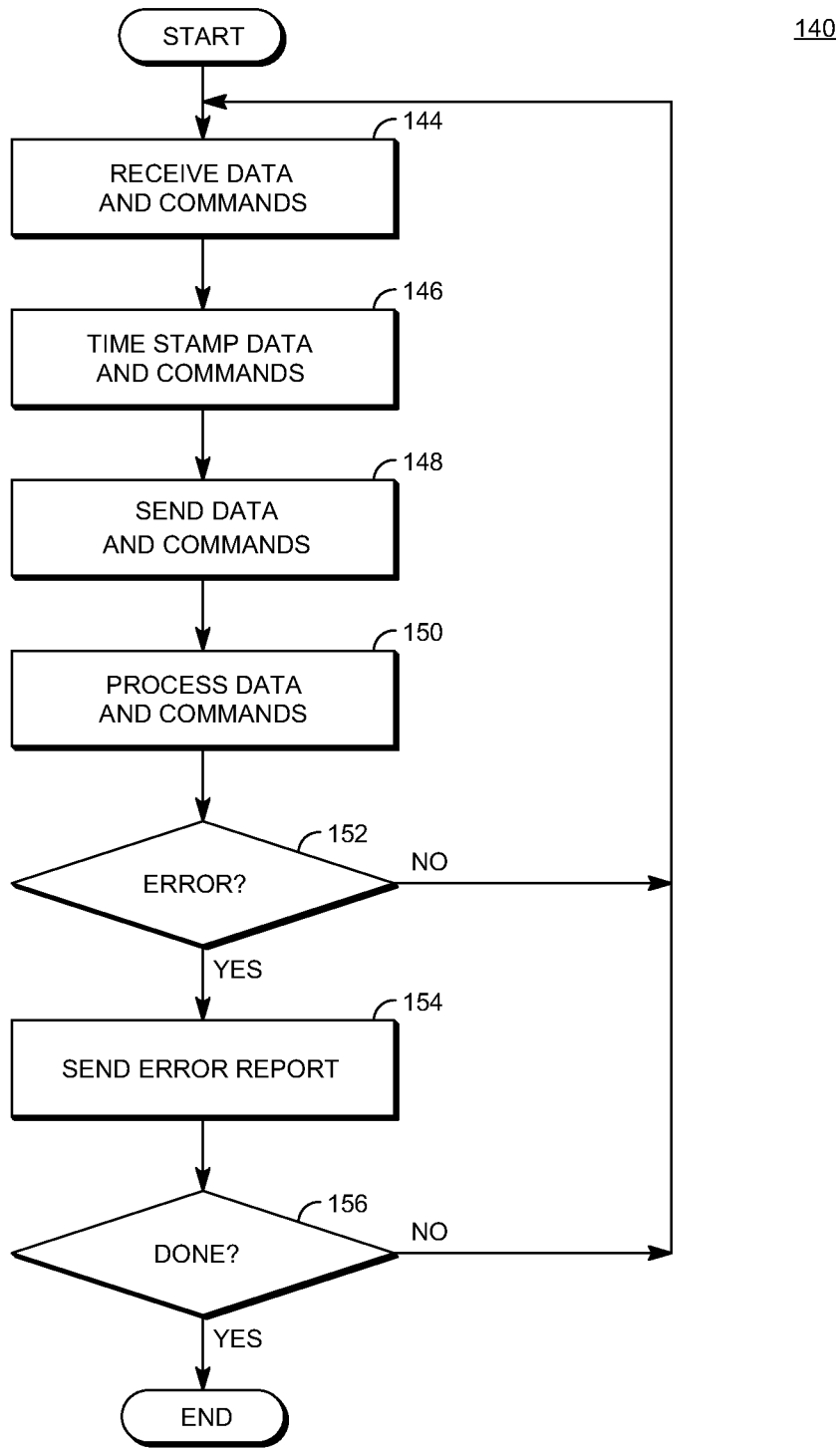
FIG. 2 is a flowchart of a data replication process at a first station according to an embodiment of the invention.

The process of updating replicated databases with a programmed delay is illustrated by FIG. 2. FIG. 2 is a flowchart 140 of a database replication process at a first station according to an embodiment of the invention. In this example, first station 12 initiates database commands as described above, but the process would work the same if second station 30 initiated the database commands.

The database replication process 144 of first station 12 receives data and commands to update the database in step 144. The data and commands can be input from users or generated programmatically, possibly from another station. The data and commands are time stamped at step 146 to indicate when they were received so that commands are processed in the order in which they were received. Copies of the time stamped data and commands are sent in step 148 to second station 30 as discussed hereinafter. Then, the data and commands are processed on the first station 12 in step 150. First station 12 checks for errors in step 152. An error can be found by first station 12 during the course of processing the data and commands in step 150 or can be sent to first station 12 from the inputting source when it decides that a data or command was erroneous.

If first station indicates an error in step 152, process 140 advances to step 154 to send an error report to the same destination(s) as the data and commands were originally sent in step 148, along with instructions on how to correct the previous commands and data. This could include changing data values or deleting commands entirely. Other conditions that might not be strictly interpreted as errors could also be handled in this manner. For example, a command might be received to set an item in a database to a certain value, followed by a command to change that value. If no intervening commands access the value, the commands could be combined to update the item to the second value without bothering to set it to the first value temporarily. At step 156, whether or not any errors were found and reported, first station 12 checks to see if processing is done. If database replication process 140 is not done in step 144, the process branches back to receive more data and commands in step 144. Otherwise the process ends.

Figure 3:
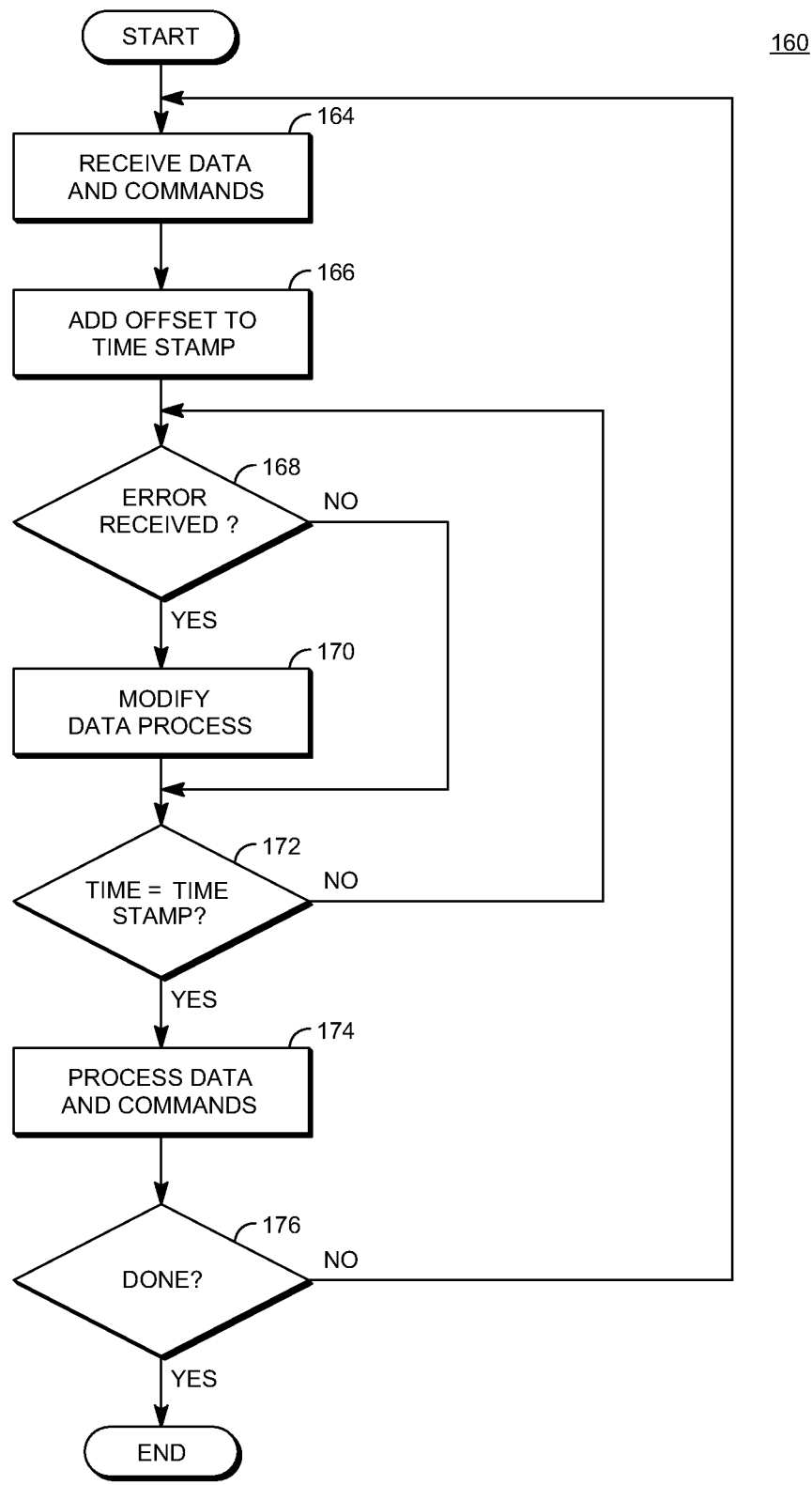
FIG. 3 is a flowchart of a data update process at a second station according to another embodiment of the invention.

FIG. 3 is a flowchart of a data update process 160 at a second station according to another embodiment of the invention. More specifically, the processing of FIG. 3 is performed by second station 30, which needs to keep its replicated database synchronized with the database on first station 12.

Data update process 160 starts when second station 30 receives data and commands in step 164 that are sent from database replication process 140 running on first station 12 in step 148. In step 166, second station 30 adds a preselected offset to the time stamps and queues the commands and data for processing when the system time for second station 30 reaches the time stamp time. While the commands and data are queued for processing, data update process 160 periodically checks for error reports in step 168. These error reports are those, if any, sent from first server 12 in step 154 of database replication process 140. If no error report is received, processing advances to step 172 to test a time stamp. If an error report is received that corresponds to a command or data currently in the queue established in step 166, processing advances from step 168 to step 170. In step 170, data update process 160 modifies or deletes that queued command or data before checking the time stamp in step 172. Modifying or deleting a command or data may also result in re-ordering the queue of commands and data to keep them in strict time stamp order.

At step 172, the time stamp on the command at the head of the queue is tested to see if the system time of second station 30 has reached the time stamp. If the time stamp does not match the system time in step 172, data update process 160 loops back to step 168 to check for more errors. If the time stamp matches the system time in step 172, second station 30 updates the replicated copy of the database to match the database on first station 12. Processing then checks the queue to see if more commands are to be processed in step 176 and returns to step 164 to repeat the process for the remaining commands and data of the queue. Otherwise, data update process 160 ends.

FIG. 4 is a table 180 containing examples of queued time stamped commands and data. In this example, each row of the table contains a time stamp in hour:minute:second format followed by a sample SQL command. This sequence of commands would create a database table called "tb1_1( )" with INT possible entries at time 15:21:00. One second later (15:21:01), a command is queued that inserts the data VALUES (1) into the database table "tb1_1" at the location "id". The database table "tb1_1" would then be commanded to insert the data VALUES(2) at location "id" at time 15:21:02 or one second later. The COMMIT command instructs second station 12 to execute the preceding commands at time 15:21:03.

FIG. 5 is a table 190 containing the commands and data of FIG. 4 including an offset added to the time stamps. This demonstrates the processing of step 166 performed by second station 30. Note that the time stamps in the first column now read 15:26:00 through 15:26:03, an offset of 300 seconds. This offset permits second station 30 to process updated to the replicated database in a reasonably short time while still leaving time for the sending process to detect and correct errors. The offset may be adjusted up or down to provide the desired trade off between update speed and error correction time window and may depend on the characteristics of network 28. In addition, embodiments of this invention can manage the time delay offset by building an offset table that contains time stamp offsets referencing the SQL commands of table 180. Table 180 would remain unchanged, and the offset table would be consulted as the SQL commands are processed to determine the actual offset and when they should be processed. Accordingly, the offset could comprise one value for all commands or a plurality of different values. By pre-programming the table with differing offset values, the database replication speed could be safely and quickly changed during processing by selecting a different value from the table if desired. In some embodiments, the offset is between a range of one through 1000 seconds.

Embodiments of this invention may be arranged in a client/server system where the database server resides on one station and one or more clients contain replications of this database on another station. In these embodiments, one station would run the database replication process 140 and one or more second stations would run the database update process 160. The replications of the database would be mainly used as a backup for the original database in case of equipment failure or other events that could corrupt the original database. In other embodiments, at least one second station 30 may be operative to input, time stamp and forward commands to replicate on one or more further stations containing copies of the replicated database. In this case, second station 30 would be running both database replication process 140 and database update process 160, sending updates to the other stations while processing updates from first station 12. Further embodiments of this invention may comprise combinations of these two arrangements with some stations operative to generate and process updates and other stations operative to process updates only.

The embodiments of first station 12 and/or second station 30 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the terms "computer" or "processor" should be understood as encompassing any of the foregoing hardware, either singly or in combination, or any other device capable of processing information. The terms "signal" and "data" are used interchangeably. Further, portions of first station 12 and second station 30 do not necessarily have to be implemented in the same manner.

In one embodiment, for example, first station 12 or second station 30 can be implemented using a general purpose computer/processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor, such as memory 34. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for replicating a process performed on a first computer on a remote computer, comprising:
receiving a plurality of commands from the first computer at the remote computer;
identifying a first time stamp associated with each of the plurality of commands, each first time stamp representing a time at which a respective command was generated;

forming a queue for the plurality of commands in an order based on the first time stamp;
determining a second time stamp associated with each of the plurality of commands that is a function of the associated first time stamp and an offset;
performing the process by executing commands in the queue when a system time stamp of the remote computer reaches the second time stamp associated with each of the commands in the queue;
receiving an error signal at the remote computer, the error signal associated with a command of the plurality of commands; and
modifying the command responsive to the error signal when the error signal is received before the command is executed, wherein modifying the command includes at least one of postponing execution of the command by assigning a later time to the second time stamp associated with the command, removing the command from the queue, or changing data associated with the command.

2. The method of claim 1 wherein the plurality of commands includes a plurality of structured query language (SQL) instructions associated with a database.

3. The method of claim 1 wherein the offset is between a range of one through 1000 seconds.

4. The method of claim 3 wherein the offset comprises a plurality of offset values.

5. The method of claim 1 wherein the plurality of commands is received at the remote computer via at least one intermediary computer.

6. The method of claim 1, further comprising:
transmitting the plurality of commands to the remote computer with the first time stamp associated with each of the plurality of commands; and
subsequently transmitting an error signal to the remote computer, the error signal associated with a command of the plurality of commands.

7. The method of claim 1 wherein determining the second time stamp comprises adding the associated first time stamp and the offset.

8. The method of claim 1, further comprising:
receiving an error signal at the remote computer, the error signal associated with a command of the plurality of commands; and
modifying the queue responsive to the error signal when the error signal is received before the command is executed.

9. The method of claim 8 wherein modifying the queue comprises omitting the command from those of the commands executed while performing the process.

10. An apparatus for replicating a process performed on a first computer on a remote computer, comprising:
a memory of the remote computer; and
a processor of the remote computer configured to execute instructions stored in the memory to:
receive a plurality of commands from the first computer;
identify a first time stamp associated with each of the plurality of commands, each first time stamp representing a time at which a respective command was generated;
form a queue for the plurality of commands in an order based on the first time stamp;
determine a second time stamp associated with each of the plurality of commands that is a function of the associated first time stamp and an offset;
perform the process by executing commands in the queue when a system time stamp of the remote computer reaches the second time stamp associated with each of the commands in the queue;
receiving an error signal at the remote computer, the error signal associated with a command of the plurality of commands; and
modify the command responsive to the error signal when the error signal is received before the command is executed, wherein the command is modified by performing at least one of postponing execution of the command by assigning a later time to the second time stamp associated with the command, removing the command from the queue, or changing data associated with the command.

11. The apparatus of claim 10 wherein the plurality of commands includes a plurality of structured query language (SQL) instructions associated with a database.

12. The apparatus of claim 10 wherein the offset is between a range of one through 1000 seconds.

13. The apparatus of claim 10, further comprising:
a second remote computer, the second remote computer including a memory and a processor configured to execute instructions stored in the memory to:
receive the plurality of commands from the first computer;
identify the first time stamp associated with each of the plurality of commands, each first time stamp representing the time at which the respective command was generated;
form the queue for the plurality of commands in the order based on the first time stamp;
determine the second time stamp associated with each of the plurality of commands that is the function of the associated first time stamp and the offset; and
perform the process by executing the commands in the queue when a system time stamp of the second remote computer reaches the second time stamp associated with each of the commands in the queue.

14. The apparatus of claim 13, further comprising:
the first computer including a memory and a processor configured to execute instructions stored in the memory to:
transmit the plurality of commands from the first computer to the remote computer and the second remote computer.

15. A non-transitory computer readable medium including program instructions executable by one or more processors, that, when executed cause the one or more processors to perform operations, the operations comprising:
identifying, at the remote computer, a predetermined time offset;
receiving, at the remote computer and subsequent to identifying the predetermined time offset, a plurality of commands executed by a first computer in performing a process;
identifying a first time at which at least one command of the plurality of commands was executed by the first computer; and
executing, at the remote computer, the at least one command at a second time that is determined as a function of the first time and the predetermined time offset.

* * * * *